(12) United States Patent
Jackson et al.

(10) Patent No.: US 6,487,893 B2
(45) Date of Patent: *Dec. 3, 2002

(54) APPARATUS AND METHOD FOR PRESSURE TESTING THE SEALING ENGAGEMENT OF THE FITTINGS ASSOCIATED WITH THE COMMUNICATION LINES OF A WELL TOOL

(75) Inventors: Stephen L. Jackson, Richmond, TX (US); John R. Whitsitt, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 21 days.

This patent is subject to a terminal disclaimer.

(21) Appl. No.: 09/733,486

(22) Filed: Dec. 8, 2000

(65) Prior Publication Data

US 2001/0017052 A1 Aug. 30, 2001

Related U.S. Application Data

(63) Continuation-in-part of application No. 09/420,013, filed on Oct. 18, 1999.

(51) Int. Cl.⁷ ............................. G07M 3/04; E21B 47/00
(52) U.S. Cl. .................. 73/49.6; 73/152.01; 73/40.5 R; 73/49.1; 166/250.08
(58) Field of Search ................... 166/250.08; 73/40.5 R, 73/152.01, 49.1, 49.6

(56) References Cited

U.S. PATENT DOCUMENTS

| | | |
|---|---|---|
| 2,956,823 A | 10/1960 | Benjamin, Jr. et al. |
| 3,141,685 A | 7/1964 | Watts |
| 3,333,459 A | 8/1967 | Claycomb |
| 3,695,642 A | 10/1972 | De Woody |
| 4,132,111 A | 1/1979 | Hasha |
| 4,152,924 A | 5/1979 | Mayo |
| 4,154,302 A | 5/1979 | Cugini |
| 4,281,679 A | 8/1981 | Stearns |

(List continued on next page.)

FOREIGN PATENT DOCUMENTS

GB  2333786 A  8/1999

*Primary Examiner*—Hezron Williams
*Assistant Examiner*—Michael Cygan
(74) *Attorney, Agent, or Firm*—Trop, Pruner & Hu, P.C.; Jeffrey E. Griffin; Brigitte L. Jeffery (57) ABSTRACT

A system for pressure testing the seals and fittings associated with at least one communication line passing through a well tool mandrel, each communication line housed within a communication line conduit defined through the well tool and sealingly engaged to each end of its corresponding communication line conduit by way of a fitting and the fittings also sealingly engaged to the communication line conduit. The system generally comprises a testing conduit, a testing passageway system, and a testing plug. The testing conduit is defined in the well tool mandrel. The testing passageway system is defined in the well tool mandrel and provides fluid communication between the testing conduit and the fittings and seals associated with each of the communication line conduits. The testing plug provides fluid communication between a pressure testing source and the testing passageway system. A pressure source is operatively connected to the testing plug, and pressurized fluid is guided from the testing plug, through the testing passageway system, into the communication line conduits, and into contact with the with the fittings and seals associated with each of the communication line conduits. Any leaks discovered as a result of this pressurization indicate the presence of a faulty engagement of the fittings or seals associated with the communication line conduits. This operation is performed prior to inserting the well tool in the well bore and without the pressurization of the well tool internal bore.

68 Claims, 8 Drawing Sheets

U.S. PATENT DOCUMENTS

| | | |
|---|---|---|
| 4,373,380 A | 2/1983 | Mayo |
| 4,553,776 A | 11/1985 | Dodd |
| 4,581,919 A * | 4/1986 | Sullivan ................ 73/40.5 R |
| 4,712,813 A | 12/1987 | Passerell et al. |
| 4,716,962 A | 1/1988 | Rundell |
| 4,744,421 A | 5/1988 | Wood et al. |
| 4,832,381 A | 5/1989 | Boulton |
| 5,314,209 A | 5/1994 | Kuhne |
| 5,577,556 A | 11/1996 | Reed |
| 5,890,541 A * | 4/1999 | Jennings et al. ....... 166/250.08 |
| 6,032,736 A * | 3/2000 | Terrell .................. 166/250.08 |
| 6,056,327 A | 5/2000 | Bouldin et al. |
| 6,186,229 B1 | 2/2001 | Martin et al. |
| 6,269,683 B1 * | 8/2001 | Jackson ..................... 166/373 |

\* cited by examiner

APPARATUS AND METHOD FOR PRESSURE TESTING THE SEALING ENGAGEMENT OF THE FITTINGS ASSOCIATED WITH THE COMMUNICATION LINES OF A WELL TOOL

This application is a continuation-in-part and claims the benefit of the filing date of U.S. patent application Ser. No. 09/420,013 filed by Jackson on Oct. 18, 1999.

BACKGROUND OF THE INVENTION

1. Field of Invention

The present invention relates to the field of downhole tool testing. More specifically, the invention relates to a system and method for pressure testing the fittings and seals associated with the lines or cables disposed through a well tool prior to insertion of the tool downhole and without the need to pressurize the tubing bore.

2. Related Art

It is sometimes necessary to pass and connect lines or cables through conduits defined in a well tool. Such lines or cables may include control lines, permanent downhole cables, permanent encapsulated cables, fiber optic lines, or chemical injection lines (hereinafter referred to as "communication lines"). The communication lines provide fluid, hydraulic, chemical, or electrical communication between elements above the well tool and elements beneath the well tool. In order to properly connect the communication lines, fittings and seals are disposed at least on the upper and lower ends of the conduits. The fittings and seals provide the sealing connection between the communication lines and the conduits so that the integrity of the communication lines is maintained throughout their entire lengths from their source to their downhole destination.

It is imporant to test the integrity of the communication line fittings and seals to ensure their proper operation. The testing of communication line fittings and seals is normally performed by pressurizing specific channels associated with the relevant communication line, connecting a gauge to one end of the communication line, and observing for any depressurization in the gauge which would indicate the existence of a leak. It would thus be beneficial to the prior art to provide a system and method to perform such testing.

Pressure testing the seals and fittings associated with a communication line becomes more intricate if the well tool carrying the communication line also includes settable elements (such as the seal elements in packers). In these cases, the pressurization of the specific channels associated with the relevant communication line must be achieved without prematurely setting the settable elements associated with the tool. It would therefore be beneficial to the prior art to provide a system and method for testing a tool's communication line fittings and seals that does not cause the premature setting of any elements associated with the tool.

In addition, once the well tool is placed in the downhole environment, the testing of associated communication line seals and fittings is complicated. An easier and more practical approach would be to conduct the test of the communication line seals and fittings at the surface of the well prior to inserting the tool downhole. The prior art would therefore benefit from a system and method for testing a tool's communication line fittings and seals at the surface of the well prior to the insertion of the tool in the well.

It is also more complicated to conduct tests that require the pressurization of the tubing bore of the well tool. Pressurizing the tubing bore requires seals on both ends of the well tool as well as relatively more powerful pressure supply equipment. It would therefore be beneficial to the prior art to provide a system and method for testing a tool's communication line fittings and seals that does not require the pressurization of the tubing bore of the tool.

SUMMARY OF THE INVENTION

It is therefore an objective of the present invention to provide a system and method that:
- enables the testing of a tool's communication line fittings and seals;
- may be utilized in a substantial number of types of well tools;
- enables such testing to be performed without prematurely setting any elements associated with the tool;
- enables such testing to be performed at the surface of the well prior to the insertion of the tool inside the wellbore;
- does not require the pressurization of the tubing bore of the tool; and
- allows communication between the conduits which house the communication lines and the tubing bore thereby preventing the formation of atmospheric chambers.

Other objectives of the present invention will be obvious by reading the specification and claims appended hereto.

To achieve such objectives, my invention is a system for pressure testing the seals and fittings associated with at least one communication line passing through a well tool mandrel, each communication line housed within a communication line conduit defined through the well tool and sealingly engaged to each end of its corresponding communication line conduit by way of a fitting and the fittings also sealingly engaged to the communication line conduit. The system generally comprises a testing conduit, a testing passageway system, and a testing plug. The testing conduit is defined in the well tool mandrel. The testing passageway system is defined in the well tool mandrel and provides fluid communication between the testing conduit and the fittings and seals associated with each of the communication line conduits. The testing plug provides fluid communication between a pressure testing source and the testing passageway system. A pressure source is operatively connected to the testing plug, and pressurized fluid is guided from the testing plug, through the testing passageway system, into the communication line conduits, and into contact with the with the fittings and seals associated with each of the communication line conduits. Any leaks discovered as a result of this pressurization indicate the presence of a faulty engagement of the fittings or seals associated with the communication line conduits. This operation is performed prior to inserting the well tool in the well bore and without the pressurization of the well tool internal bore.

The operation of my testing system also provides an inventive method to conduct such pressure testing, the method comprising providing a testing conduit and a testing passageway system in the well tool mandrel, the testing passageway system providing fluid communication between the testing conduit and the fittings and seals associated with each of the communication line conduits; and injecting pressurized fluid from a pressure testing source, through the testing conduit, through the testing passageway system, into each communication line conduit, and into contact with the fittings and seals associated with each of the communication line conduits.

DETAILED DESCRIPTION OF THE INVENTION

The testing system of this invention is shown generally in FIGS. 1–6 as 10. As best seen in FIGS. 1A–1D, the testing system 10 is situated on the mandrel 12 of a well tool 14 having an internal bore 13. As known in the art, mandrel 12 is part of a body of well tool 14. Although the well tool 14 illustrated in the Figures is a packer, it is understood that the testing system 10 may be included in any tool with a mandrel 12 that requires communication lines to be passed therethrough. The testing system 10 is, however, particularly useful with packers, as will be disclosed herein.

The well tool 14 includes at least one communication line conduit 16 axially defined in the mandrel 12 from the mandrel first end 18 to the mandrel second end 20. A conduit first end 22 is defined at the mandrel first end 18, and a conduit second end 24 is defined at the mandrel second end 20. A conduit tubing 32 is provided within each conduit 16. Preferably, the conduit tubing 32 extends from a position proximate the conduit first end 22 to a position proximate the conduit second end 24. A communication line 26 is passed completely through the conduit 16 and within the conduit tubing 32. Communication line 26 is typically operatively connected and extends to equipment above and below the well tool 14. As previously disclosed, it is understood that communication line 26 may comprise any of a variety of lines or cables, including control lines, permanent downhole cables, permanent encapsulated cables, fiber optic lines, or chemical injection lines.

Figure 1A:
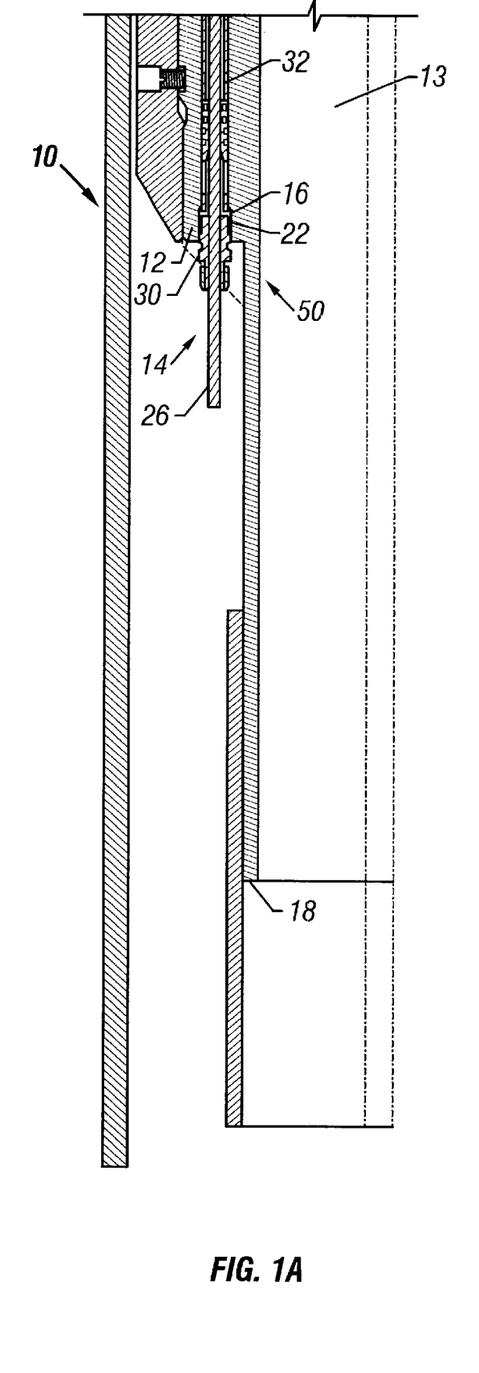
FIGS. 1A–1D are a partial longitudinal cross-sectional view of a well tool (packer) that includes the testing system.
Figure 1B:
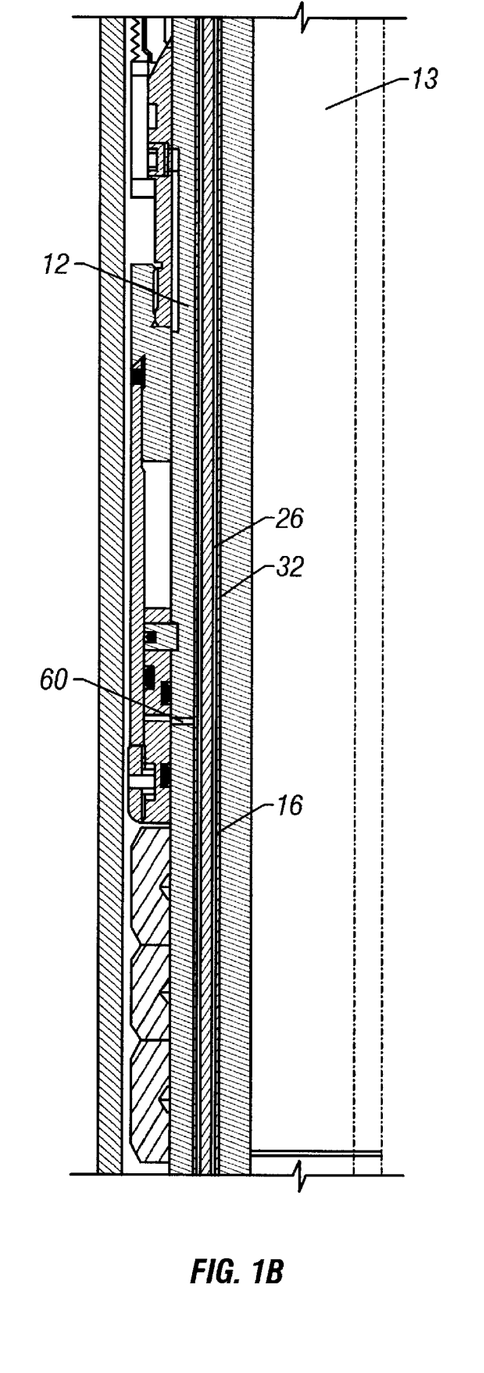
Figure 1C:
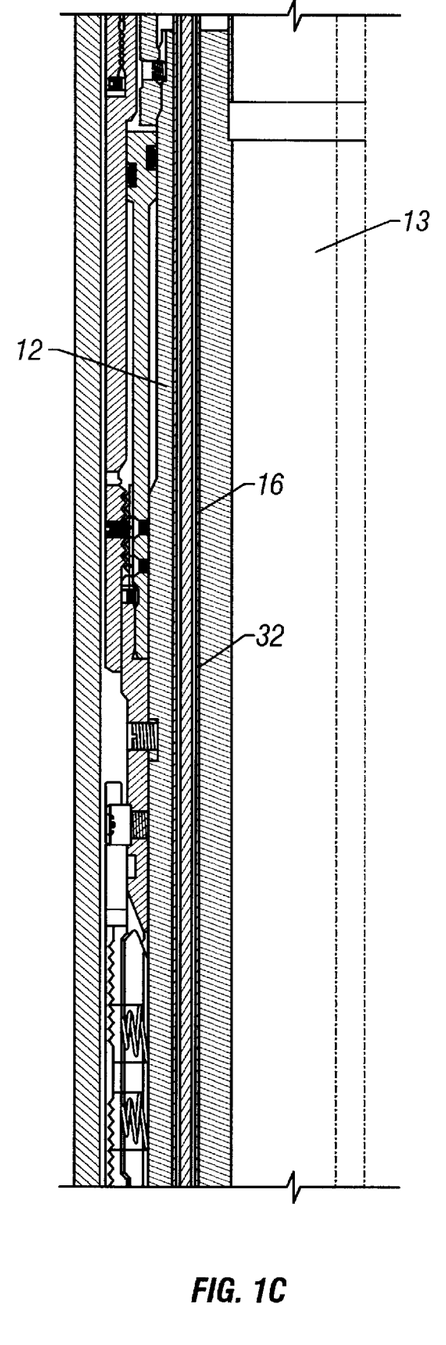
Figure 1D:
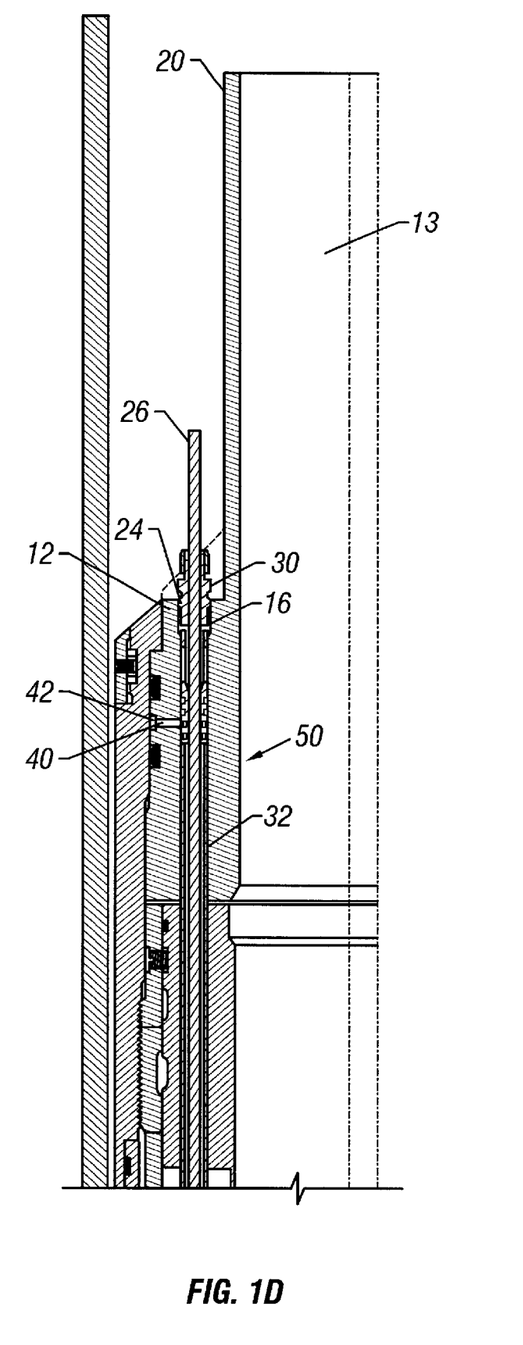
Figure 2:
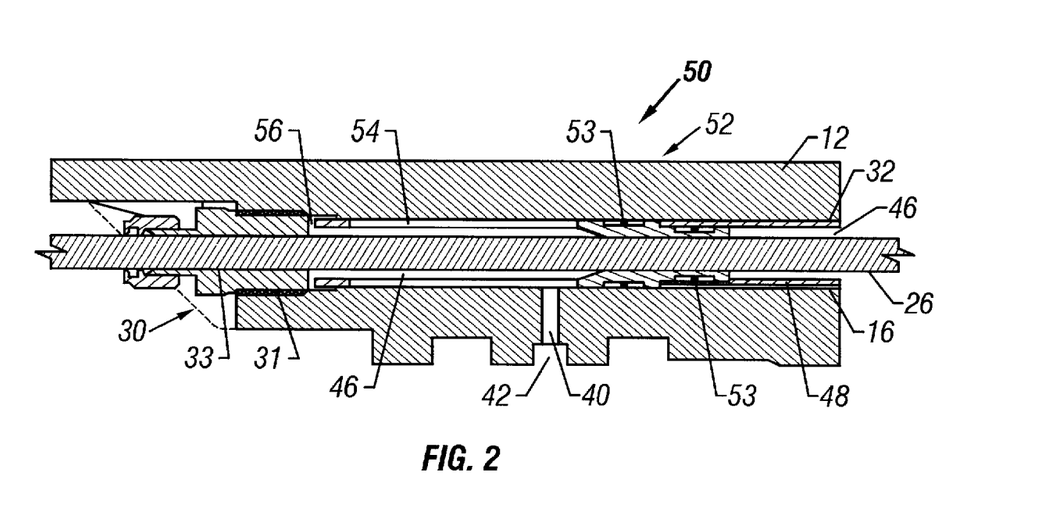
FIG. 2 is an enlarged view of one end of a communication line conduit illustrating the connections between the communication line conduit, the communication line, the conduit tubing, the fitting, and the bypass component.

Turning to FIGS. 1A, 1D, and 2, at each of its ends and within its respective conduit 16, each conduit tubing 32 is connected to a bypass component 50. Bypass component 50 is preferably generally tubular and generally maintains the axial profile of the conduit tubing 32. Each communication line 26 extends through its two corresponding bypass components 50. Bypass component 50 includes a sealing mechanism 52 that comprises at least two seals 53, one seal 53 providing a sealing engagement between the bypass component 50 and the conduit tubing 32 and the other seal 53 providing a sealing engagement between the bypass component 50 and the conduit 16. The bypass component 50 that is proximate one end, 18 or 20, of the mandrel, preferably the mandrel second end 20, also includes at least one slot 54. The slot 54 is in fluid communication with, and is preferably radially adjacent to, a conduit port 40, as will be disclosed herein. A fitting 30 is threadably sealably engaged on its outer surface 31 to each conduit 16 at each of the conduit first end 22 and the conduit second end 24. Each fitting 30 is proximate a bypass component 50 with a gap 56 axially defined therebetween. The communication line 26 is communicated through the inner surface 33 of each fitting 30 and is sealably engaged thereto. The seals associated with each fitting 30 are therefore the sealing engagement between the fitting outer surface 31 and the conduit 16 and the sealing engagement between the fitting inner surface 33 and the communication line 26.

As best shown in FIG. 2, two spaces, each preferably annular in shape, are defined by the interrelation between the conduit 16, the conduit tubing 32, the communication line 26, the bypass component 50, and the fittings 30. A first space 46 is generally defined in the radial direction between the communication line 26 and the conduit tubing 32. First space 46 extends longitudinally between the fittings 30. A second space 48 is generally defined in the radial direction between the conduit tubing 32 and the conduit 16. Second space 48 extends longitudinally between the bypass components 50, specifically between the seals 53 sealing the bypass components 50 to the conduit 16.

Figure 3:
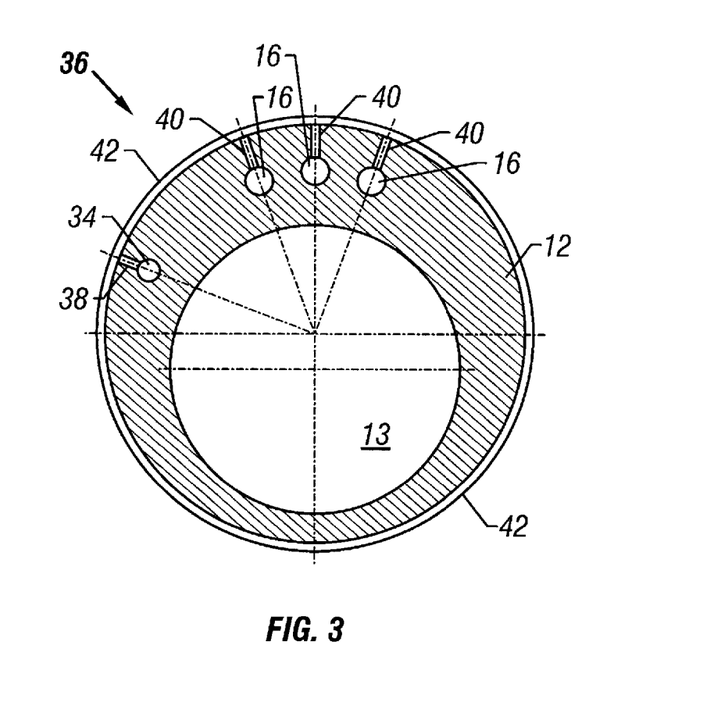
FIG. 3 is a cross-sectional view taken along line 3—3 of FIG. 4, illustrating the fluid communication between the communication line conduits, the testing passageway system, and the testing conduit.
Figure 4:
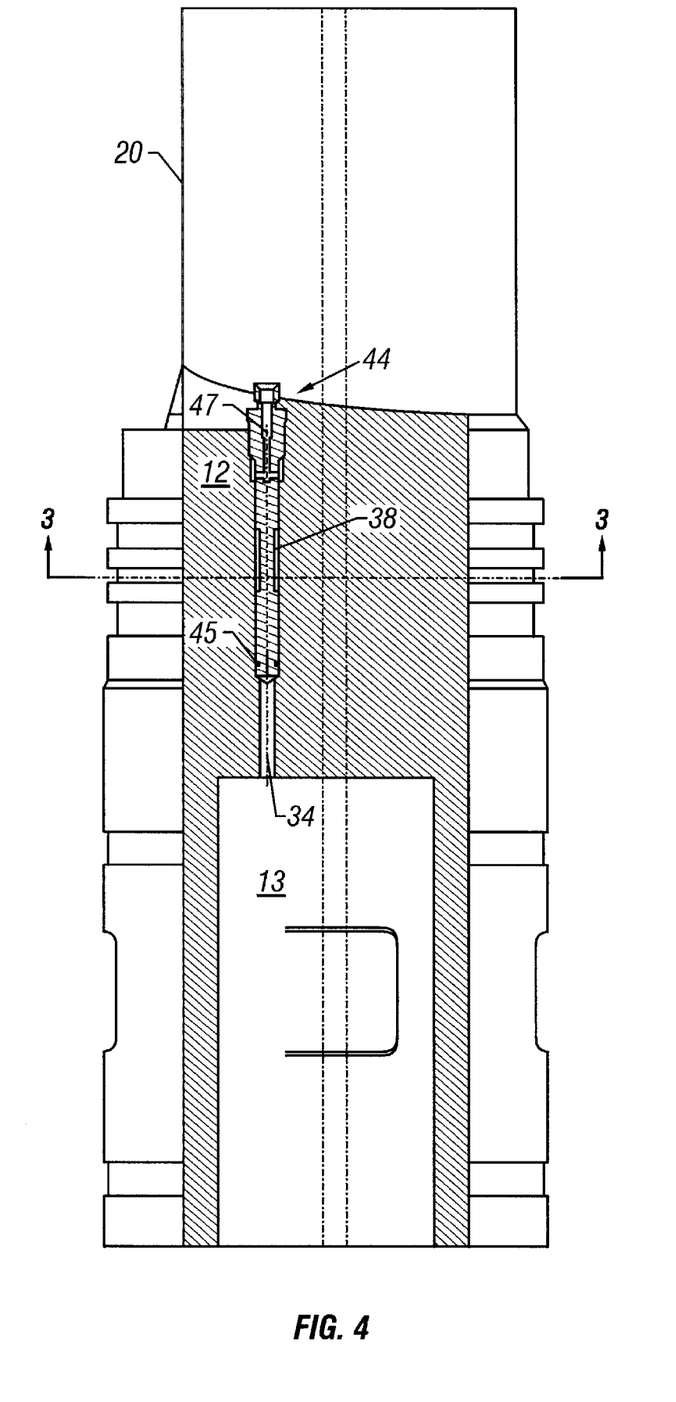
FIG. 4 is a partial longitudinal cross-sectional view of the well tool illustrating the connection between the testing plug and the testing conduit.
Figure 5:
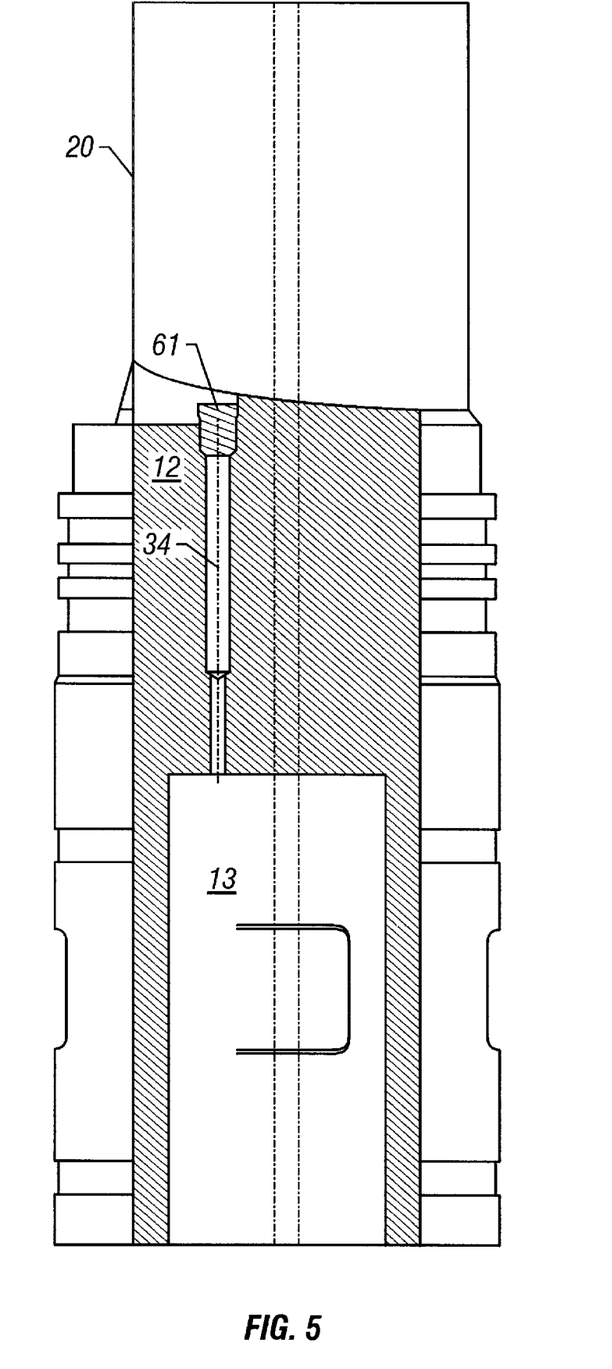
FIG. 5 is a partial longitudinal cross-sectional view of the well tool illustrating the connection between the standard plug and the testing conduit.
Figure 6:
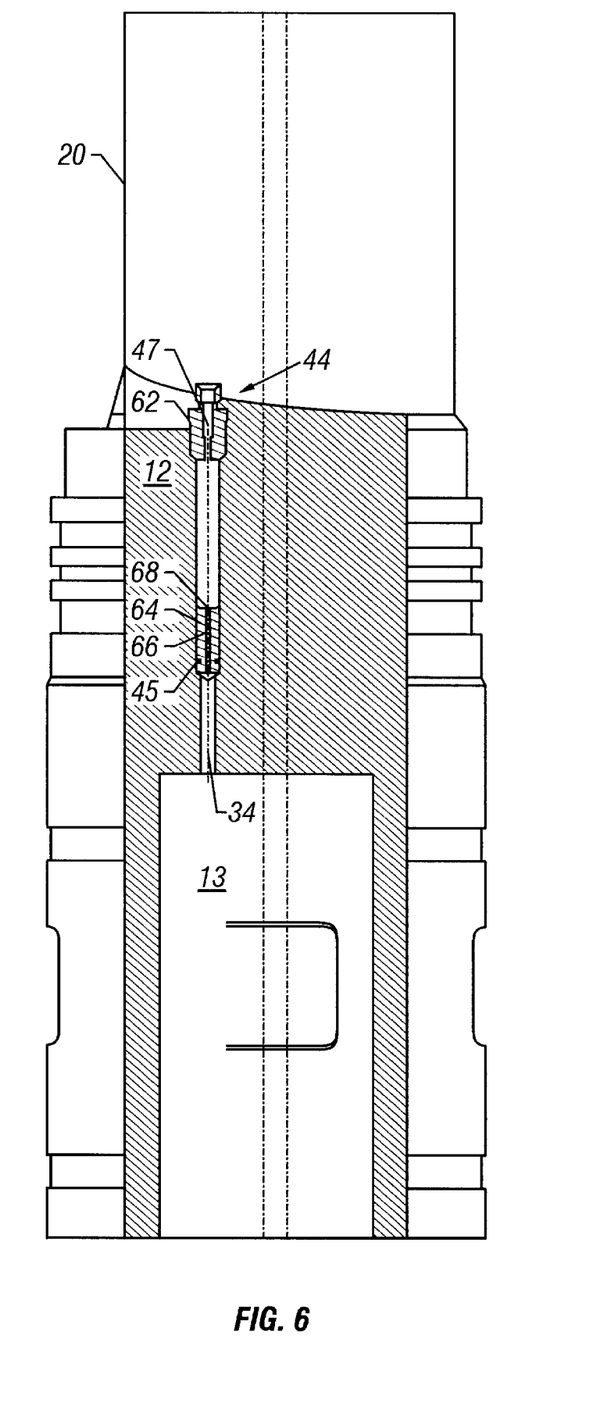
FIG. 6 is a partial longitudinal cross-sectional view of the well tool illustrating the connection of the first testing plug piece and the rupture disk in the testing conduit.

As shown in FIGS. 3, 4 and 6, testing system 10 also comprises a testing conduit 34, a testing passageway system 36, and a testing plug 44. Testing conduit 34 is axially defined in the mandrel 12 from one of the mandrel ends, 18 or 20, to the well tool bore 13. Preferably, testing conduit 34 extends through the mandrel 12 from the mandrel second end 20 to the well tool bore 13. Testing passageway system 36 provides fluid communication between the testing conduit 34 and each of the conduits 16, specifically the first space 46 of each conduit 16. Testing conduit 34 and testing passageway 36 are collectively referred to herein as "test flow path". Test flow path may also refer to other passageways through the body of the well tool which achieve the same functions as the testing conduit and the testing passageway.

In the preferred embodiment, testing passageway system 36 comprises a testing conduit inlet 38 associated with the testing conduit 34, a conduit port 40 associated with each conduit 16, and a testing duct 42 providing fluid communication between the testing conduit inlet 38 and each conduit port 40. Preferably, the testing duct 42 is an annular duct defined within the mandrel 12, the testing conduit inlet 38 extends radially from the testing conduit 34 to the testing duct 42, and each of the conduit ports 40 extend radially from their respective communication line conduits 16 to the testing duct 42.

Testing plug 44 threadably sealably engages to the testing conduit 34 at the relevant mandrel end, 18 or 20. Testing plug 44 is operatively connected to a pressure testing source (not shown) and provides fluid communication by way of a testing plug passageway 47 between the pressure testing source and the testing passageway system 36 (specifically testing conduit inlet 38). Testing plug 44, however, prohibits fluid communication between the pressure testing source and the well tool bore 13 by way of a seal 45 sealingly engaging the testing conduit 34 and placed intermediate the testing passageway system 36 (testing conduit inlet 38) and the well tool bore 13.

In the preferred embodiment as shown in FIGS. 3 and 4, testing plug 44 extends from the relevant mandrel end, 18 or 20, past the junction between the testing conduit inlet 38 and the testing conduit 34. The testing plug passageway 47 preferably extends from the relevant mandrel end, 18 or 20, to the testing conduit inlet 38.

In an alternative embodiment as shown in FIG. 6, testing plug 44 comprises a first testing plug piece 62 and a rupture disk 64. First testing plug piece 62 is threadably sealably engaged to the testing conduit 34 at the relevant mandrel end, 18 or 20. First testing plug piece 62 is operatively connected to a pressure testing source (not shown) and provides fluid communication by way of a testing plug passageway 47 between the pressure testing source and the testing passageway system 36 (specifically the testing conduit inlet 38). First testing plug piece 62 extends from the relevant mandrel end, 18 or 20, to a location intermediate the relevant mandrel end, 18 or 20, and the junction between the testing conduit inlet 38 and the testing conduit 34. Rupture disk 64 initially prohibits fluid communication between the pressure testing source and the well tool bore 13 and is securely placed intermediate the testing passageway system 36 (testing conduit inlet 38) and the well tool bore 13. Rupture disk 64 includes a seal 45 sealingly engaging the testing conduit 34. Rupture disk 64 also includes a rupture disk passageway 66 that is initially blocked by a disk 68. As is well-known in the art, disk 68 is rated to rupture at a certain pre-determined pressure thereafter leaving the rupture disk passageway 66 unblocked and allowing fluid communication between the well tool bore 13 and the testing passageway system 36.

Figure 7:
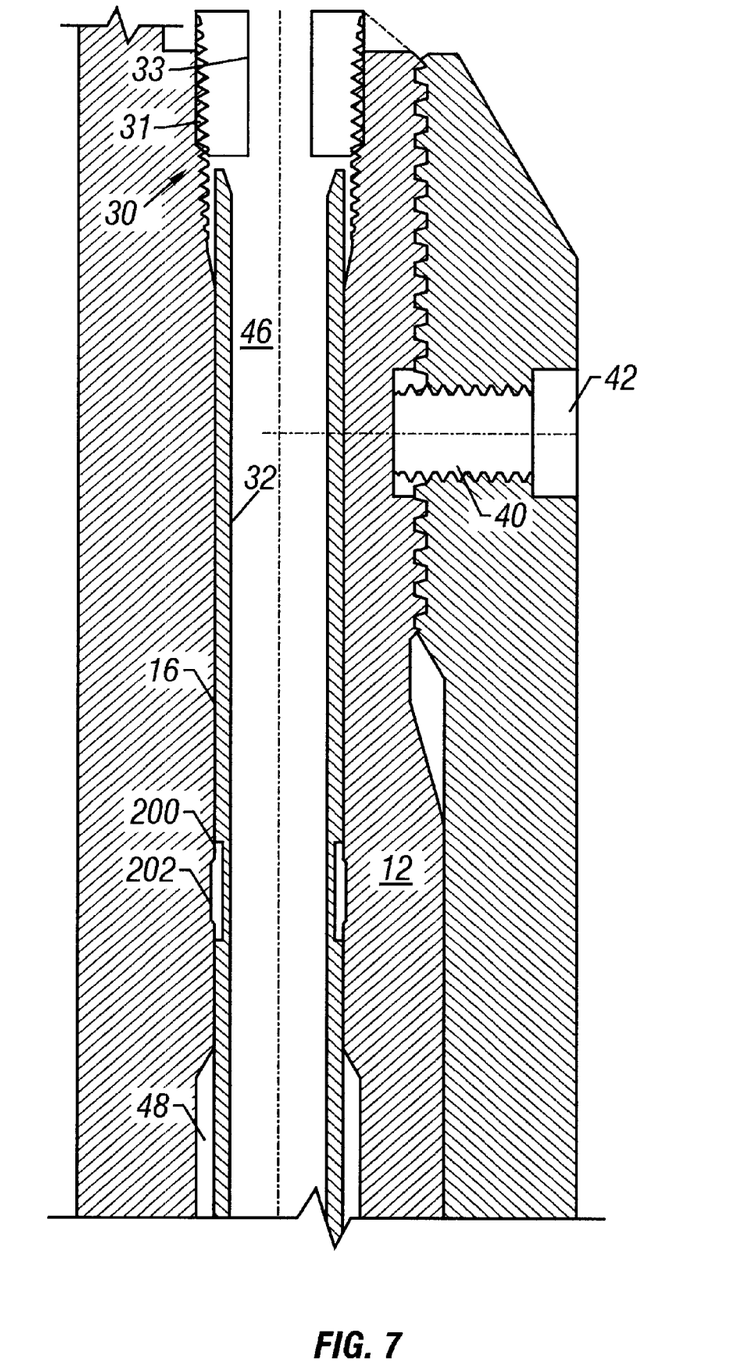
FIG. 7 is an enlarged cross-sectional view of another embodiment of the testing system illustrating the connections between the communication line conduit, the communication line, the conduit tubing, and the fitting.

In another embodiment as shown in FIG. 7, the conduit tubing 32 is disposed within the relevant communication line conduit 16 as in the previous embodiment, however this embodiment does not include a bypass component 50. Instead, the conduit tubing 32 in this embodiment is sealed against the communication line conduit 16 by way of a seal 200 disposed within a groove 202 defined on the communication line conduit 16. The communication line 26, which would be passed through the conduit tubing 32 and sealed against the fittings 30, is not shown in FIG. 7 for purposes of clarity. A seal 200 and groove 202 connection is included proximate each end of the conduit tubing 32. In an alternative embodiment (not shown), the groove 202 is included on conduit tubing 32.

The conduit tubing 32 may also be sealingly attached to the conduit 16 with other forms of seals, such as welding or a groove defined on the conduit tubing 32 (instead of on the conduit 16) holding a seal therein. These sealing engagements/arrangements, including the sealing mechanism 52 of bypass components 50 and the seal 200 and groove 202 connection, are referred to herein as a "seal area" between the conduit tubing 32 and the conduit 16.

As in the previous embodiment, a first space 46 is generally defined in the radial direction between the communication line 26 and the conduit tubing 32. First space 46 extends longitudinally between the fittings 30. The second space 48 is generally defined in the radial direction between the conduit tubing 32 and the conduit 16. Second space 48 extends between the seal areas.

In Operation

Prior to introduction of the tool 14 into the wellbore but after inserting the communication lines 26 through the tool 14 (as previously disclosed), an operator first ensures that the testing plug 44 is correctly sealably engaged to the relevant mandrel end, 18 or 20. The pressure supply is next activated, which injects fluid pressure into the testing plug passageway 47. The fluid pressure is prohibited from reaching the tool bore 13 side of the testing conduit 34 by the seal 45. The fluid pressure is thus forced to travel from the testing plug passageway 47 through the testing conduit inlet 38 and into the testing duct 42. Within the testing duct 42, the fluid pressure follows the annular profile of the testing duct 42 until it reaches the conduit ports 40.

In the embodiment including bypass components 50, the fluid pressure then enters each conduit port 40 and flows through the relevant bypass component slot 54 into the first space 46 defined between the communication line 26 and the conduit 16. Within the first space 46, the fluid pressure extends in both directions longitudinally along the outer surface of the communication line 26. Note that the bypass component 50 does not seal against the communication line 26 thereby allowing the flow of pressurized fluid longitudinally therebetween and along the communication line 26. However, due to the presence of the seals 53 which seal the bypass components 50 to the conduit 16, the fluid pressure does not enter the second space 48. The fluid pressure extends in the first space 46 through the gaps 56 and toward each fitting 30 until reaching the sealing engagement between the inner surface 31 of the fittings 30 and the communication line 26 and the sealing engagement between the outer surface 33 of the fittings 30 and the conduit 16. Full pressurization of the testing system 10 has been achieved at this point.

In the embodiment including seals 200, the fluid pressure then enters each conduit port 40 and flows through the first space 46 defined between the communication line 26 and the conduit 16. Within the first space 46, the fluid pressure extends in both directions longitudinally along the outer surface of the communication line 26. Note that there is no seal between the conduit tubing 32 and the communication line 26 thereby allowing the flow of pressurized fluid longitudinally therebetween and along the communication line 26. However, due to the presence of the seals 200 which seal between the conduit tubing 32 and the conduit 16, the fluid pressure does not enter the second space 48. The fluid pressure extends in the first space 46 and toward each fitting 30 until reaching the sealing engagement between the inner surface 31 of the fittings 30 and the communication line 26 and the sealing engagement between the outer surface 33 of the fittings 30 and the conduit 16. Full pressurization of the testing system 10 has been achieved at this point.

In each embodiment, the seal areas prevent fluid communication between the first space 46 and the second space 48. Second space 48 is therefore hydraulically isolated from first space 46.

Particularly for well tools 14 that are packers, it is important to note that the pressurized fluid does not enter the second space 48. The second space 48 is in fluid communication with the setting ports 60 of the well tool 14. Thus, if pressurized fluid were to enter the second space 48, the fluid would also pass into the setting ports 60, and depending on the pressure of the fluid, the fluid may cause the settable elements (such as sealing elements) of the well tool 14 to prematurely set. Of course, such an occurrence is not desired.

The operator then observes any depressurization in the pressure gauge attached to the pressure supply in order to detect the presence of any leaks in the system. If the operator does not notice any decrease in pressure, then the communication lines 26 and their associated fittings and seals are satisfactorily sealingly engaged. However, if the operator does notice a decrease in pressure, then this signifies either the presence of a leak somewhere in the communication line 26 system, perhaps at the fittings 30 or at the bypass components 50 or seals 200, or the presence of a leak at the testing plug seal 45. In either respect, the well tool 14 is not ready for insertion into the wellbore, and the communication line 26 sealing system must be checked and fixed. The testing procedure is then repeated until a satisfactory test result, as defined above, is achieved.

In the embodiment in which testing plug 44 comprises one integral piece as shown in FIGS. 3 and 4, once a satisfactory test result is achieved, the testing system 10 is deactivated and depressurized, and the testing plug 44 is wholly removed from the testing conduit 34. A standard plug 61 is then inserted in its place prior to inserting the well tool 14 downhole. Importantly, the standard plug 61 allows fluid communication between the tool bore 13 and the testing conduit inlet 38 through the testing conduit 42. The standard plug 61, however, seals, against mandrel second end 20 preventing fluid communication from testing conduit 34 through mandrel second end 20 and into the tool exterior.

In the embodiment in which testing plug 44 comprises a first testing plug piece 62 and a rupture disk 64, once a satisfactory test result is achieved, the pressure testing source is activated to pressurize the testing system 10 above the pressure rating of the disk 68 thereby rupturing disk 68 and allowing fluid communication between the well tool bore 13 and the testing passageway system 36. First testing plug piece 62 is then removed from the testing conduit 34, and a standard plug 61 is inserted in its place prior to running the well tool 14 downhole (not shown with rupture disk 64 but similar to that of FIG. 5). Importantly, the standard plug 61 allows fluid communication between the tool bore 13 and the testing conduit inlet 38 through the testing conduit 34. The standard plug 61, however, seals against mandrel second end 20 preventing fluid communication from testing conduit 34 through mandrel second end 20 and into the tool exterior.

Because the testing conduit inlet 38 is in fluid communication with the first space 46, the tool bore 13 is then also in fluid communication with the first space 46 once the standard plug 61 has replaced the testing plug 44. This fluid communication enables whatever fluid is present in the tool bore 13 after the tool 14 is inserted downhole ("the downhole fluid") to flow into the first space 46. As is understood by those skilled in the art, the downhole fluid will also typically be present in the annulus of the wellbore and typically enters the second space 48 through the setting ports 60. Since the downhole fluid is present at either side of the conduit tubing 32 (within the first space 46 and within the second space 48), pressure is balanced across the conduit tubing 32 thereby ensuring that the communication line 26 does not rupture as a result of trapped pressure pockets once the well tool 14 is inserted downhole.

An important feature is that pressure is balanced across the conduit tubing 32 between first space 46 and second space 48. In one embodiment, the setting ports 60 are in fluid communication with the tool bore 13. Since the setting ports 60 are in fluid communication with the second space 48, the fluid in the tool bore 13 will be present in the second space 48 and the first space 46. It is noted that such a packer may be set by pressuring up the tool bore 13. Therefore, when the tool bore 13 is pressurized, the pressurized fluid will enter both the first space 46 and the second space 48, and the settable elements will be activated by the pressurized fluid acting through the setting ports 60.

The operation of the testing system 10 thus provides an inventive method for pressure testing the seals and fittings 30 associated with at least one communication line 26 passing through a well tool 14, the method comprising: providing a testing conduit 34 and a testing passageway system 36 in the well tool mandrel 12, the testing passageway system 36 providing fluid communication between the testing conduit 34 and the fittings 30 and seals associated with each of the communication line conduits 16; and injecting pressurized fluid from a pressure testing source, through the testing conduit 34, through the testing passageway system 36, into each communication line conduit 16, and into contact with the fittings 30 and seals associated with each of the communication line conduits 16.

The method may further comprise, after the providing step and before the injecting step, inserting a testing plug 44 in the testing conduit 34, the testing plug 44 providing fluid communication between the pressure testing source and the testing passageway system 36. In addition, such method may also comprise, after the inserting step, replacing the testing plug 44 with a standard plug that prevents fluid communication between the testing conduit 34 and the well tool exterior but allows fluid communication between the well tool internal bore 13 and the testing conduit passageway 36.

The method may further comprise, after the injecting step, observing whether the reading on the gauge associated with the pressure testing source decreases thereby signifying the presence of a leak in the system. In addition, such method may also comprise, after the injecting step, preventing fluid communication between the testing conduit 34 and the well tool exterior but allowing fluid communication between the well tool internal bore 13 and the testing conduit passageway 36.

The method may further comprise sealingly dividing each communication line conduit 16 into a first space 46 and a second space 48, each first space 46 being in fluid communication with the testing conduit passageway 36 and with the fittings 30 and seals of its corresponding communication line 26, each second space 48 being in fluid communication with the setting ports 60 of the well tool 14; and preventing fluid communication between the first space 46 and the second space 48. In such method, the sealingly dividing step and the preventing fluid communication step may also comprise disposing a conduit tubing 32 in each communication line conduit 16 with the corresponding communication line 26 passing therethrough, the conduit tubing 32 being in sealing engagement with its corresponding communication line conduit 16 at each of its ends, the first space 46 generally defined in the radial direction between each communication line 26 and its corresponding conduit tubing 32, and the second space 48 generally defined in the radial direction between each conduit tubing 32 and its corresponding conduit 16. In addition, such method may also comprise, after the injecting step, balancing the pressure between the first space 46 and the second space 48.

Figure 8:
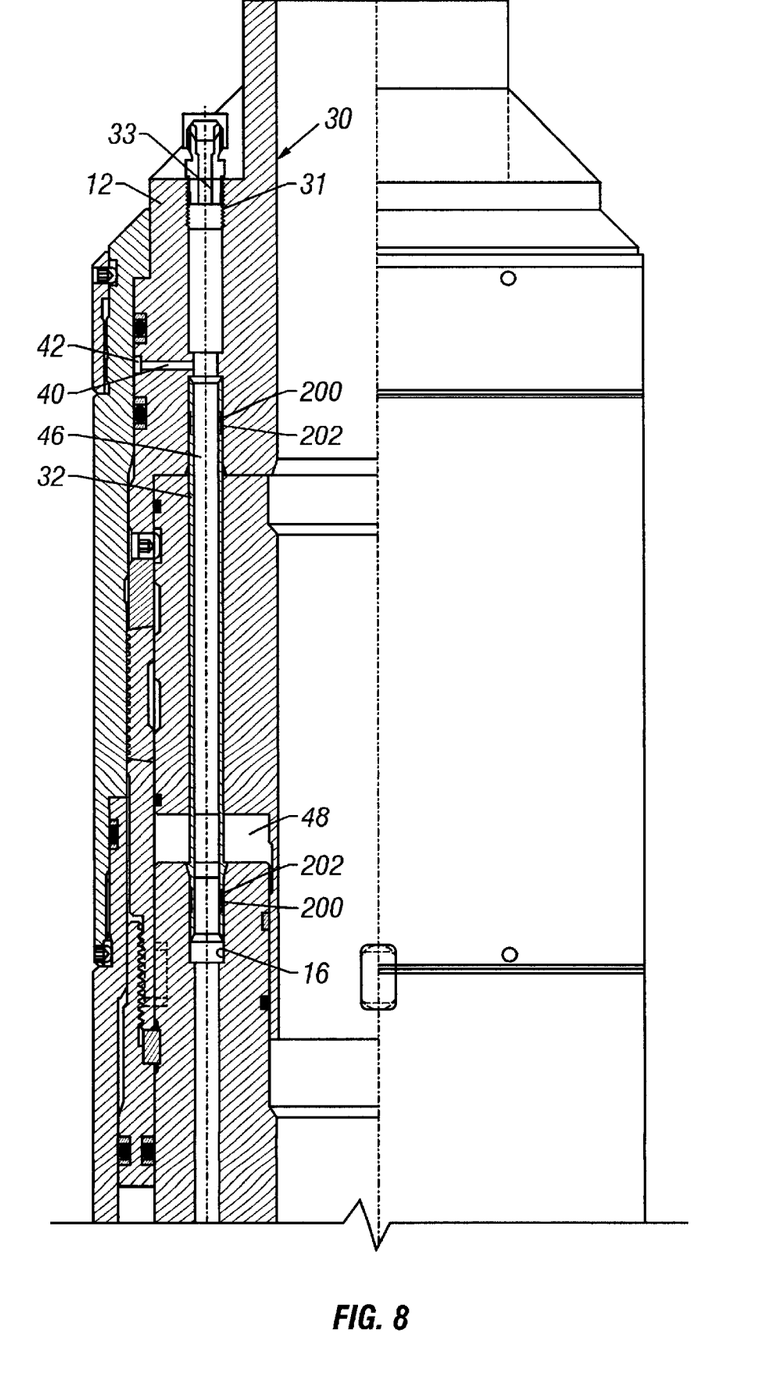
FIG. 8 is an enlarged cross-sectional view of another embodiment of the testing system illustrating a conduit tubing that does not extend the entire length of the communication line conduit.

It is noted that the Figures illustrate a mandrel or body constructed from a plurality of mandrel or body sections that are joined to each other at junctions. The conduit tubing 32 and the seal areas (between the first space 46 and second space 48) in this type of mandrel or body ensure that only the fittings 30 are tested during the testing step and not the junctions between the mandrel sections. In another embodiment as shown in FIG. 8, the conduit tubing 32 does not extend the entire length of the communication line conduit 16 and only extends over the junction(s) of the mandrel or body sections. The remainder of the testing system remains the same, with the seal areas between the conduit tubing 32 and conduit 16 creating first and second spaces as previously discussed. In another embodiment (not shown), the tool is constructed from a one-piece mandrel. Therefore, the conduit tubing 32 is not required in this embodiment. The remainder of the testing system remains the same, wherein pressurized fluid from the pressure source is injected into the communication line conduit 16 via the testing passageway system 36 and acts against (tests) the fittings 30 of the relevant communication line 26.

It is to be understood that the invention is not limited to the exact details of construction, operation, exact materials or embodiments shown and described, as obvious modifications and equivalents will be apparent to one skilled in the art. Accordingly, the invention is therefore to be limited only by the scope of the appended claims.

We claim:

1. A well tool adapted to be disposed in a wellbore, comprising:
    a communication line;
    a body having at least one communication line conduit, the communication line extending through the communication line conduit;
    at least one fitting sealingly engaged to the at least one communication line conduit and adapted to sealingly engage the communication line, the at least one fitting comprising an interior surface and an exterior surface, one of the interior surface and exterior surface adapted to sealingly engage the communication line, and the other one of the interior surface and exterior surface sealingly engaged to the communication line conduit; and
    a test flow path defined in the body that provides fluid communication between the exterior of the body and the at least one communication line conduit so as to allow testing of the sealing engagement of the at least one fitting at the at least one fitting interior surface.

2. The well tool of claim 1, wherein the at least one communication line conduit is defined axially through the body.

3. The well tool of claim 1, wherein the test flow path includes a testing conduit that extends to the well tool internal bore.

4. The well tool of claim 3, further comprising:
    a testing plug disposed within the testing conduit; and
    the testing plug including a testing plug passageway that provides fluid communication between a source of pressurized fluid and the test flow path.

5. The well tool of claim 4, wherein the testing plug includes a testing plug seal prohibiting fluid communication between the source and the well tool internal bore.

6. The well tool of claim 1, wherein:
    the test flow path is selectively connectable to a source of pressurized fluid prior to deployment of the well tool in a wellbore; and
    the well tool is adapted to be disposed in the wellbore when the test flow path is not connected to the source of pressurized fluid.

7. The well tool of claim 1, wherein the well tool is a packer.

8. The well tool of claim 1, further comprising a settable element that is not actuated during the testing of the sealing engagement of the at least one fitting.

9. The well tool of claim 8, wherein:
    the at least one communication line conduit is in fluid communication with the settable element and the test flow path; and
    at least one seal is disposed in the at least one communication line conduit thereby isolating the settable element from the test flow path.

10. The well tool of claim 9, wherein the pressure acting against the settable element is balanced with the pressure within the test flow path when the well tool is disposed in a wellbore.

11. The well tool of claim 10, wherein the well tool is a packer.

12. The well tool of claim 1, further comprising:
    a conduit tubing provided in the at least one communication line conduit; and
    the conduit tubing sealingly engaged to the at least one communication line conduit in at least two seal areas located a distance apart.

13. The well tool of claim 12, wherein the at least two seal areas each comprise a seal disposed within a groove defined on the at least one communication line conduit.

14. The well tool of claim 12, wherein:
    the body comprises at least two body sections joined at a junction; and
    at least one junction is located between the at least two seal areas.

15. The well tool of claim 14, wherein the at least one junction is in fluid communication with the at least one communication line conduit.

16. The well tool of claim 12, wherein:
    a first space is generally defined interior to the conduit tubing;
    a second space is generally defined between the two seal areas and between the conduit tubing and the communication line conduit; and
    the first space is pressure balanced with the second space when the well tool is disposed in a wellbore.

17. A method for pressure testing the sealing engagement of at least one fitting associated with at least one communication line conduit included in a well tool, the at least one fitting also adapted to sealingly engage a communication line, the at least one fitting comprising an interior end and an exterior end, the method comprising:
    transmitting pressurized fluid from the exterior of the well tool, through a test flow path defined in the well tool, and into the at least one communication line conduit so as to test the sealing engagement of the at least one fitting at the at least one fitting interior end;
    monitoring the pressure of the pressurized fluid to detect the presence of leaks in the sealing engagement of the at least one fitting; and
    deploying the well tool into a wellbore subsequent to the monitoring.

18. The method of claim 17, further comprising, before the transmitting step, inserting a testing plug in a testing conduit of the test flow path, the testing plug providing fluid communication between a source of pressurized fluid and the test flow path.

19. The method of claim 18, further comprising, after the monitoring, replacing the testing plug with a standard plug that prevents fluid communication between the exterior of the well tool and the at least one communication line conduit but allows fluid communication between the at least one communication line conduit and a well tool internal bore.

20. The method of claim 18, wherein the inserting comprises inserting a first testing plug piece and a rupture disk in the testing conduit, the first testing plug piece providing fluid communication between the source and the test flow path, and the rupture disk initially prohibiting fluid communication between a well tool internal bore and the at least one communication line conduit.

21. The method of claim 20, further comprising, after the monitoring, bursting the rupture disk to provide fluid communication between the well tool internal bore and the at least one communication line conduit.

22. The method of claim 21, further comprising, after the bursting, replacing the first testing plug with a standard plug that prevents fluid communication between the at least one communication line conduit and the exterior of the well tool.

23. The method of claim 17, further comprising, after the monitoring, preventing fluid communication between the at least one communication line conduit and the well tool exterior but allowing fluid communication between a well tool internal bore and the at least one communication line conduit.

24. The method of claim 17, wherein the well tool is a packer.

25. The method of claim 17, wherein the transmission step comprises transmitting the pressurized fluid without actuating a settable element of the well tool.

26. The method of claim 25, wherein the settable element and the test flow path are both in fluid communication with the at least one communication line conduit.

27. The method of claim 26, further comprising isolating the settable element from the test flow path.

28. The method of claim 27, further comprising, after the transmission step, balancing the pressure acting against the settable element with the pressure within the test flow path.

29. The method of claim 28, wherein the well tool is a packer.

30. The method of claim 17, further comprising:
  sealing a conduit tubing within the at least one communication line conduit in two seals areas located a distance apart so that a first space is generally defined interior of the conduit tubing and a second space is generally defined between the seal areas and between the conduit tubing and the at least one communication line conduit; and
  balancing the pressure between the first space and the second space subsequent to the transmitting.

31. The method of claim 30, wherein each seal area comprises a seal disposed within a groove defined on the at least one communication line conduit.

32. The method of claim 30, wherein the transmitting comprises transmitting pressurized fluid into the first space.

33. The method of claim 30, wherein the balancing step occurs subsequent to the monitoring step.

34. The method of claim 17, wherein the transmitting and monitoring are performed prior to deploying the well tool into the wellbore.

35. A system for pressure testing the sealing engagement of at least one fitting associated with at least one communication line conduit included in at least one well tool, comprising:
  the at least one fitting sealingly engaged to the at least one communication line conduit and adapted to sealingly engage a communication line, the at least one fitting comprising an interior surface and an exterior surface, wherein the interior surface is adapted to engage the communication line;
  a test flow path defined in the at least one well tool that provides fluid communication between the exterior of the at least one well tool and the at least one communication line conduit so as to allow testing of the sealing engagement of the at least one fitting at the at least one fitting interior surface; and
  a source of pressurized fluid selectively connectable to the test flow path.

36. A method for pressure testing the sealing engagement of at least one fitting associated with at least one communication line conduit included in a well tool, the at least one fitting also adapted to sealingly engage a communication line, the at least one fitting comprising an interior end and an exterior end, the method comprising:
  connecting a source of pressurized fluid from the exterior of the well tool to a test flow path defined in the well tool;
  injecting pressurized fluid from the source through the test flow path and into the at least one communication line conduit so as to test the sealing engagement of the at least one fitting at the at least one fitting interior end;
  monitoring the pressure of the pressurized fluid to detect the presence of leaks in the sealing engagement of the at least one fitting; and
  deploying the well tool into a wellbore subsequent to the monitoring.

37. The method of claim 36, wherein the connecting, injecting, and monitoring are performed prior to deploying the well tool into the wellbore.

38. A method for pressure testing the sealing engagement of at least one fitting associated with at least one communication line conduit included in a well tool, the well tool including a settable element, the at least one fitting also adapted to sealingly engage a communication line, the method comprising:
  transmitting pressurized fluid through a test flow path and into the at least one communication line conduit so as to test the sealing engagement of the at least one fitting, the transmitting occurring without the actuation of the settable element;
  monitoring the pressure of the pressurized fluid to detect the presence of leaks in the sealing engagement of the at least one fitting; and
  deploying the well tool into a wellbore subsequent to the monitoring.

39. The method of claim 38, wherein the transmitting and monitoring are performed prior to deploying the well tool into the wellbore.

40. The method of claim 38, wherein the settable element and the test flow path are both in fluid communication with the at least one communication line conduit.

41. The method of claim 40, further comprising isolating the settable element from the test flow path.

42. The method of claim 41, further comprising, after the transmission step, balancing the pressure acting against the settable element with the pressure within the test flow path.

43. The method of claim 42, wherein the well tool is a packer.

44. A method for pressure testing the sealing engagement of at least one fitting associated with at least one communication line conduit included in a well tool, the at least one fitting also adapted to sealingly engage a communication line, the method comprising:
  providing the communication line through the communication line conduit;
  sealing a conduit tubing within the at least one communication line conduit in two seal areas located a distance apart so that a first space is generally defined interior of the conduit tubing and a second space is generally defined between the seal areas and between the conduit tubing and the at least one communication line conduit;

testing the sealing engagement of the at least one fitting; and deploying the well tool into a wellbore subsequent to the testing.

45. The method of claim 44, wherein each seal area comprises a seal disposed within a groove defined on the at least one communication line conduit.

46. The method of claim 44, wherein the testing step comprises injecting pressurized fluid into the first space.

47. The method of claim 44, further comprising balancing the pressure between the first space and the second space.

48. The method of claim 49, wherein the balancing step occurs subsequent to the testing step.

49. The method of claim 44, wherein:

the well tool comprises at least two body sections joined at a junction; and at least one junction is located within the second space.

50. The method of claim 44, wherein the sealing and testing are performed prior to deploying the well tool into the wellbore.

51. A well tool adapted to be disposed in a well bore, comprising:

a body having at least one communication line conduit;

at least one fitting sealingly engaged to the at least one communication line conduit and adapted to sealingly engage a communication line;

a test flow path that provides fluid communication to the at least one communication line conduit so as to allow testing of the sealing engagement of the at least one fitting; and a settable element that is not actuated during the testing of the sealing engagement of the at least one fitting.

52. The well tool of claim 51, wherein:

the at least one communication line conduit is in fluid communication with the settable element and the test flow path; and at least one seal area is located in the at least one communication line conduit thereby isolating the settable element from the test flow path.

53. The well tool of claim 52, wherein the at least one seal area comprises a seal disposed within a groove defined on the at least one communication line conduit.

54. The well tool of claim 52, wherein the pressure acting against the settable element is balanced with the pressure within the test flow path when the well tool is disposed in a wellbore.

55. The well tool of claim 54, wherein the well tool is a packer.

56. The well tool of claim 51, wherein the at least one communication line extends through the communication line conduit.

57. The well tool of claim 56, wherein the fitting has an inner surface adapted to sealingly engage the communication line.

58. The well tool of claim 56, wherein:

the body comprises at least two body sections joined at a junction; and at least one junction is located between the at least two seal areas.

59. The well tool of claim 58, wherein the at least one of the junctions is in fluid communication with the at least one communication line conduit.

60. The well tool of claim 56, wherein:

a first space is generally defined interior to the conduit tubing;

a second space is generally defined between the at least two seal areas and between the conduit tubing and the at least one communication line conduit; and the first space is pressure balanced with the second space when the well tool is disposed in a wellbore.

61. The well tool of claim 56, wherein the communication line extends through the communication line conduit.

62. A method for pressure testing the sealing engagement of at least one fitting associated with at least one communication line conduit included in a well tool, the at least one fitting also adapted to sealingly engage a communication line, the method comprising:

prior to deploying the well tool into a wellbore, pressure testing the sealing engagement of the at least one fitting in the well tool comprising at least two body sections joined at a junction, at least one junction in fluid communication with the at least one communication line conduit;

isolating the at least one junction from the pressure generated in the pressure testing; and deploying the well tool into a wellbore subsequent to the testing.

63. A well tool adapted to be disposed in a wellbore, comprising:

a one-piece mandrel having at least one communication line conduit;

at least one fitting sealingly engaged to the at least one communication line conduit and adapted to sealingly engage a communication line; and a test flow path defined in the mandrel that provides fluid communication between the exterior of the mandrel and the at least one communication line conduit so as to allow testing of the sealing engagement of the at least one fitting.

64. The well tool of claim 63, wherein the communication line extends through the communication line conduit.

65. A well tool adapted to be disposed in a wellbore, comprising:

a body comprising at least two communication line conduits;

at least one fitting sealingly engaged to each of the at least two communication line conduits and adapted to sealingly engage a communication line disposed within each of the at least two communication line conduits; and a test flow path defined in the body that provides fluid communication between the exterior of the body and the at least two communication line conduits so as to allow testing of the sealing engagement of each of the at least one fitting.

66. A well tool adapted to be disposed in a wellbore, comprising:

a body further comprising at least one communication line conduit, the at least one communication line conduit comprising a first end and a second end;

at least one fitting sealingly engaged proximate the first end of the at least one communication line conduit and to a communication line disposed in the at least one communication line conduit;

at least one fitting sealingly engaged proximate the second end of the at least one communication line conduit and to the communication line disposed in the at least one communication line conduit; and a test flow path defined in the body that provides fluid communication between the exterior of the body and the at least one communication line conduit so as to allow testing of the sealing engagement of the at least one fitting sealingly engaged proximate the first end of the at least one communication line conduit, and the sealing engagement of the at least one fitting sealingly engaged proximate the second end of the at least one communication line conduit.

67. A well tool adapted to be disposed in a wellbore, comprising:

- a body further comprising at least one communication line conduit, the at least one communication line conduit comprising a first end and a second end;
- at least one fitting sealingly engaged proximate the first end of the at least one communication line conduit and to a communication line disposed in the at least one communication line conduit;
- at least one fitting sealingly engaged proximate the second end of the at least one communication line conduit and to the communication line disposed in the at least one communication line conduit; and
- a test flow path defined in the body that provides fluid communication between the exterior of the body and a space in the at least one communication line conduit intermediate the at least one fitting sealingly engaged proximate the first end of the at least one communication line conduit and the at least one fitting sealingly engaged proximate the second end of the at least one communication line conduit.

68. A well tool adapted to be disposed in a wellbore, comprising:

- a body having at least one communication line conduit, the at least one communication line conduit traversing an entire length of the well tool;
- at least one fitting sealingly engaged to the at least one communication line conduit and adapted to sealingly engage a communication line; and
- a test flow path defined in the body that provides fluid communication between the exterior of the body and the at least one communication line conduit so as to allow testing of the sealing engagement of the at least one fitting.

* * * * *